United States Patent
Bevers et al.

(10) Patent No.: US 11,578,292 B2
(45) Date of Patent: Feb. 14, 2023

(54) PROCESS FOR THE PREPARATION OF A STABLE BEVERAGE

(71) Applicant: DSM IP ASSETS B.V., Heerlen (NL)

(72) Inventors: Loes Elizabeth Bevers, Echt (NL); Johanna Henrica Gerdina Maria Mutsaers, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 207 days.

(21) Appl. No.: 17/040,771

(22) PCT Filed: Mar. 26, 2019

(86) PCT No.: PCT/EP2019/057531
§ 371 (c)(1),
(2) Date: Sep. 23, 2020

(87) PCT Pub. No.: WO2019/185600
PCT Pub. Date: Oct. 3, 2019

(65) Prior Publication Data
US 2021/0002592 A1 Jan. 7, 2021

(30) Foreign Application Priority Data
Mar. 29, 2018 (EP) .................................... 18164942

(51) Int. Cl.
C12C 5/00 (2006.01)
C12C 7/24 (2006.01)
C12C 12/00 (2006.01)
A23L 2/84 (2006.01)

(52) U.S. Cl.
CPC ................ C12C 5/004 (2013.01); C12C 7/24 (2013.01); C12C 12/002 (2013.01); *A23L 2/84* (2013.01); *A23V 2002/00* (2013.01)

(58) Field of Classification Search
CPC ... C12C 5/004; C12C 7/24; A23L 2/66; A23L 2/84
See application file for complete search history.

(56) References Cited

U.S. PATENT DOCUMENTS

| 8,119,171 B2 | 2/2012 | Lopez et al. |
| 2009/0297689 A1 | 12/2009 | Edens et al. |

FOREIGN PATENT DOCUMENTS

| CN | 101479380 A | 7/2009 |
| EP | 1914298 A1 | 7/2005 |
| WO | 2002046381 A2 | 6/2002 |
| WO | 2008000714 A1 | 1/2008 |
| WO | 2015177153 A1 | 11/2015 |
| WO | 2017009100 A1 | 1/2017 |
| WO | 2017085210 A1 | 5/2017 |

OTHER PUBLICATIONS

E. Tarcsa et al: "The Fate of Trichohyalin: Sequential Post-Translational Modifications by Peptidyl-Arginine Deiminase and Transglutaminases", Journal of Biological Chemistry, vol. 272, No. 44, Oct. 31, 1997, p. 27893-27901.
"Azuma, Norihiro et al., "Role of the Arginyl Residues of κ-Casein in Micelle Formation—Effect of Deimination on as1-κ-Casein Complex Formation", Int. Dairy Journal, Jan. 1, 1994, pp. 193-204, vol. 4, No. 3".
International Search Report Issued in Counterpart Application No. PCT/EP2019/057531, dated Jul. 15, 2019.
T. Nagodawithana and G. Reed, "Enzymes in food processing" 3rd edition, Academic press Inc., San Diego, Chapter 17, Section V, p. 448-449.

*Primary Examiner* — Vera Stulii
(74) *Attorney, Agent, or Firm* — McBee Moore & Vanik IP, LLC; Susan McBee; Chester Moore

(57) ABSTRACT

The present invention relates to a process for reducing haze in a beverage comprising adding a protein arginine deiminase and a proline-specific endoprotease during preparation of the beverage. The invention further relates to a wort or beer comprising a protein arginine deiminase and a proline-specific endoprotease.

10 Claims, No Drawings
Specification includes a Sequence Listing.

PROCESS FOR THE PREPARATION OF A STABLE BEVERAGE

CROSS-REFERENCE TO RELATED APPLICATIONS

This application is the National Stage entry of International Application No. PCT/EP2019/057531, filed 26 Mar. 2019, which claims priority to European Patent Application No. 18164942.7, filed 29 Mar. 2018.

REFERENCE TO SEQUENCE LISTING SUBMITTED AS A COMPLIANT ASCII TEXT FILE (.txt)

Pursuant to the EFS-Web legal framework and 37 C.F.R. § 1.821-825 (see M.P.E.P. § 2442.03(a)), a Sequence Listing in the form of an ASCII-compliant text file (entitled "Sequence_Listing_2919208-538000 ST25.txt" created on 22 Sep. 2020, and 10,464 bytes in size) is submitted concurrently with the instant application, and the entire contents of the Sequence Listing are incorporated herein by reference.

BACKGROUND

Field

The present invention relates to a process for reducing haze in a beverage.

DESCRIPTION OF RELATED ART

Haze is a well-known phenomenon in the beverage industry. Haze can be present in beer, wine and fruit juice. Haze formation can occur at different stages during a brewing process. In "Enzymes in food processing" edited by T. Nagodawithana and G. Reed, $3^{rd}$ edition, Academic press Inc., San Diego, Chapter V, p. 448-449, it has been proposed that haze in beer is the result of interactions between beer proteins and polyphenolic procyanidins. It is explained that in beer haze is often formed upon chilling of the beer. Beer is fermented, matured, cold stabilised and finally packaged often under chilled conditions. To achieve clarity, beer is often filtered while cold. Despite the filtration, beer can often become cloudy after it is packaged and distributed to customers and chilled again for example before serving. Eventually haze can be even formed in beer when it is not, or no longer chilled and sediment may develop. Haze formation is undesirable because the cloudiness caused by haze formation resembles cloudiness produced by microbial spoilage, which is undesirable, especially for bright beers. Several processes for reducing haze in beverage are known in the art.

WO2002/046381 discloses a process for the reduction of haze in a beverage by adding a proline-specific endoprotease to the beverage.

EP1914298B1 discloses a process for the preparation of beer wherein a protein-deamidating enzyme, such as a peptide glutaminase or a protein deamidase, is added during the preparation of the beer. It is disclosed that by the addition of a protein-deamidating enzyme a beer-like beverage can be produced having mellowness, special flavor and good taste, and the solubility of protein that tends to become turbid may be improved.

WO2008/000714 discloses a protein arginine deiminase and the use of this enzyme in the preparation of a food product with an increased amount of citrulline.

WO2017/009100 discloses a process to improve the solubility of a plant protein, for instance pea, soy and rice protein, wherein the plant protein is incubated with a peptidyl arginine deiminase. The foam capacity of plant protein such as pea protein was reduced after incubation with peptidyl arginine deiminase.

There is a need for a further process for reducing haze in a beverage.

SUMMARY

The present invention relates to a process for reducing haze in a beverage comprising adding a protein arginine deiminase and a proline-specific endoprotease during preparation of the beverage.

The invention also relates to the use of a protein arginine deiminase and a proline-specific endoprotease to reduce haze in a beverage.

The invention also relates to wort or beer comprising a protein arginine deiminase and a proline-specific endoprotease.

Definitions

The term "derived from" as used herein in relation to the origin of an enzyme, such as enzyme having protein arginine deiminase or proline specific endoprotease activity, indicates that the enzyme is native to that microorganism In the scope of this invention, it is defined here that in order to determine the percentage of sequence identity of two amino acid sequences, the sequences are aligned for optimal comparison purposes. To optimize the alignment between the two sequences gaps may be introduced in any of the two sequences that are compared. Such alignment can be carried out over the full length of the sequences being compared. Alternatively, the alignment may be carried out over a shorter length, for example over about 20, about 50, about 100 or more amino acids. The sequence identity is the percentage of identical matches between the two sequences over the reported aligned region. The percent sequence identity between two amino acid sequences may be determined using the Needleman and Wunsch algorithm for the alignment of two sequences. (Needleman, S. B. and Wunsch, C. D. (1970) J. Mol. Biol. 48, 443-453). Both amino acid sequences and nucleotide sequences can be aligned by the algorithm. The Needleman-Wunsch algorithm has been implemented in the computer program NEEDLE. For the purpose of this invention the NEEDLE program from the EMBOSS package was used (version 2.8.0 or higher, EMBOSS: The European Molecular Biology Open Software Suite (2000) Rice, P. Longden, I. and Bleasby, A. Trends in Genetics 16, (6) pp 276-277, http://emboss.bioinformatics.nl/). For protein sequences EBLOSUM62 is used for the substitution matrix. The optional parameters used are a gap-open penalty of 10 and a gap extension penalty of 0.5. The skilled person will appreciate that all these different parameters will yield slightly different results but that the overall percentage identity of two sequences is not significantly altered when using different algorithms.

A "mature polypeptide" is defined herein as a polypeptide in its final form and is obtained after translation of a mRNA into a polypeptide and post-translational modifications of said polypeptide. Post—translational modifications include N-terminal processing, C-terminal truncation, glycosylation, phosphorylation and removal of leader sequences such as signal peptides, propeptides and/or prepropeptides by cleavage.

DETAILED DESCRIPTION

Disclosed herein is a process for reducing haze in a beverage comprising adding a protein arginine deiminase and a proline-specific endoprotease during preparation of the beverage.

Haze, also indicated as turbidity, or cloudiness, may be formed by interactions between proteins and polyphenols. The interactions usually result in a complex insoluble material comprising proteins and polyphenols.

Surprisingly, the amount of haze formed in a beverage when both protein arginine deiminase and proline-specific endoprotease are added during preparation of the beverage was less than the sum of haze reduced when either protein arginine deiminase or proline-specific endoprotease was added during preparation of the beverage. Surprisingly haze was reduced between 30% and 80%, for instance between 40% and 75%, such as between 50% and 75% relative to the amount of haze formed when no protein arginine deiminase and proline-specific endoprotease were added during preparation of the beverage.

It was also found that foam in beer was not affected when protein arginine deiminase and/or proline-specific endoprotease were added to the beer.

The wording "protein arginine deiminase" and "peptidyl arginine deiminase" are used interchangeable herein and is abbreviated with PAD. A PAD as disclosed herein may be any suitable enzyme having protein arginine deiminase activity. A PAD as disclosed herein belongs to a family of enzyme having enzyme classification number EC 3.5.3.15, which converts peptide or protein bound arginine into peptide or protein bound citrulline, also called citrullination. PAD as disclosed herein may be derived from any suitable origin, for instance from mammalian or microbial origin. PAD as disclosed herein is advantageously derived from a microbial source. For instance, PAD may be derived from fungal origin such as from *Fusarium* sp. such as *Fusarium graminearum, Chaetomium globosum, Phaesphaeria nodorum* or from bacterial origin such as from the bacteria *Streptomyces*, eg *Streptomyces scabies*, or *Streptomyces clavuligeres*. A PAD may be derived from a *Fusarium* sp., preferably a *Fusarium graminearum*.

Advantageously, peptidyl arginine deiminase is a polypeptide having peptidyl arginine deiminase activity which has at least 80%, 85%, 90%, 95%, 96%, 97%, 98%, 99% or 100% identity to the mature amino acid sequence of SEQ ID NO: 1, wherein the polypeptide has peptidyl arginine deiminase activity.

A mature polypeptide sequence of SEQ ID NO: 1 may comprise or contain amino acids 19, 20, 21, 22, 23, or 24 to 640 of the amino acid sequence of SEQ ID NO: 1, advantageously the mature polypeptide sequence of SEQ ID NO: 1 comprises or contains amino acids 22 to 640 of SEQ ID NO: 1, wherein methionine at position 1 in SEQ ID NO: 1 is counted as number 1.

A proline-specific endoprotease (PEP) as disclosed herein is a protease that hydrolyses a protein or peptide at a position where the protein or peptide contains a proline-residue. A proline-specific endoprotease may have proline-specific endoprotease and/or proline-specific oligopeptidase activity and belongs to enzyme classification number EC 3.4.21.26. A proline-specific endoprotease is preferably an enzyme that hydrolyses a peptide bond at the carboxy-terminal end of proline residues, resulting in a peptide and/or polypeptide fragment with a C-terminal proline.

A proline-specific endoprotease may be derived from any suitable microorganism, for instance the proline-specific endoprotease is derived from an *Aspergillus* sp., preferably *Aspergillus niger*.

A proline-specific endoprotease may be a polypeptide having proline-specific endoprotease activity which has least 80%, 85%, 86%, 87%, 88%, 89%, 90%, 91%, 92%, 93%, 94%, 95%, 96%, 97%, 98% or 99% identity to the mature polypeptide sequence of SEQ ID NO: 2. The mature polypeptide sequence of SEQ ID NO: 2 comprises, or has amino acids 37 to 521 of SEQ ID NO: 2, wherein methionine at position 1 in SEQ ID NO: 2 is counted as 1

The enzymes peptidyl-arginine deiminase and proline-specific endoprotease as disclosed herein can be produced by any fermentation process known in the art. Fermentation conditions typically depend on the host organism wherein the enzymes are produced. The enzymes can be expressed in a suitable host organism such as a *Bacillus, Pichia, Penicillium, Trichoderma* sp, or *Aspergillus* sp., such as *Bacillus subtilis, Pichia pastoris, Penicillium chrysogenum, Trichoderma reesei, Aspergillus niger* or *Aspergillus oryzae*. A suitable method to express a polypeptide having peptidyl arginine deiminase activity in *Aspergillus niger* is for instance disclosed in Examples 3 and 4 of WO2008/000714.

The enzyme can be recovered from culture broths by well-known methods, such as ammonium sulphate or ethanol precipitation, acid extraction, or anion or cation exchange chromatography. High performance liquid chromatography (HPLC) may be employed for purification.

A beverage in a process as disclosed herein can be fruit juice, wine or beer. A beverage in a process as disclosed herein may be beer. Beer can be prepared by any suitable process. Usually, a process for the preparation of beer comprises a mashing phase and a fermentation phase. Mashing usually comprises preparing a mash from a grist of unmalted cereals, from malted cereals or from a mixture of malted and unmalted cereals. A grist as used herein can also be a malt. Examples of cereals from which a mash and subsequently beer can be prepared are barley and wheat. In addition, mash and subsequently beer can be prepared with adjuncts such as maize, rice, sorghum, oats, or cassava.

Mashing, i.e. the process for preparing a mash, typically involves pauses (rests) at certain temperatures, for instance a pause at 43 to 51° C., a pause at 62 to 65° C., a pause at 72 to 74° C. and/or a pause at 77-78° C.

After mashing, the mash is usually filtered to obtain a wort, for instance by filtration through a Lautertun or mash filter. Subsequently, the wort is boiled. After boiling of the wort, the wort is cooled before fermenting of the wort. Fermenting wort is typically started by addition of yeast which converts the available sugars into alcohol, also known as primary fermentation. Fermenting of the wort in a process for preparing beer is usually performed at a temperature of between 5° C. and 20° C., for instance between 8° C. and 18° C., for instance between 10° C. and 14° C. Usually fermentation of beer takes 5 to 10 days, such as between 6 and 8 days, depending on the beer fermentation process applied. After fermentation a process for preparing beer usually comprises a maturation phase which is also known as the secondary fermentation. During maturation undesirable flavour components such as diketones are usually converted into better tasting components. During maturation the beer is cooled to a temperature of between −2° C. and 10° C., for instance between −1° C. and 5° C. or between 0° and 2° C. Following maturation, a process for preparing beer usually comprise a stabilisation phase. During stabilisation the formation of polyphenol-protein aggregates is promoted enabling precipitation. Maturation and stabilisation may take 1 to 10 days depending on the process conditions applied. Optionally, a process for preparing beer comprises a step of filtration, for instance after stabilisation. Usually the beer is packaged after stabilisation and/or filtration for instance in a bottle, a can or a keg. Usually, a process for preparing beer also comprises pasteurizing the beer.

Adding a protein arginine deiminase and a proline-specific endoprotease to a beverage in process as disclosed herein may be performed during any suitable step for preparing a beverage. A process for reducing haze in beer as disclosed herein may comprise adding the protein arginine deiminase and/or the proline-specific endoprotease to a wort during preparation of the beer. In one embodiment the protein arginine deiminase and/or the proline-specific endoprotease are added to the wort after filtering of the mash and before boiling of the wort A process for reducing haze in beer as disclosed herein may also comprise adding the protein arginine deiminase and/or the proline-specific endoprotease during and/or after fermentation of the beer.

Adding a protein arginine deiminase and/or a proline-specific endoprotease during preparation of the beverage usually comprises a step of incubating the protein arginine deiminase and/or the proline-specific endoprotease with the beverage or an intermediate form of the beverage before the final beverage is produced. In the event the beverage is beer, an intermediate form of the beverage may be wort. An intermediate form of a beverage may also be a beverage before it is pasteurized of sterilized. A process for reducing haze in a beverage as disclosed herein may comprise a step of pasteurizing the beverage. Pasteurizing and sterilizing a beverage are known processes to a person skilled in the art.

Incubating the protein arginine deiminase and/or the proline-specific endoprotease with the beverage or an intermediate form of the beverage, such as wort, may be performed during any suitable time, pH and temperature. When added during fermentation of beer, incubating the protein arginine deiminase and/or the proline-specific endoprotease may be performed at the temperature and during the period of fermenting the beer as disclosed herein above. Incubating the protein arginine deiminase and/or the proline-specific endoprotease with the beverage may also be performed during 0.5 to 8 hr or during 1 to 4 hrs at a temperature of between 20° C. and 50° C., for instance between 25° C. and 40° C. A suitable pH incubating may be between pH 3 and 7, such as between pH 4 and 6.

Also disclosed herein is the use of a protein arginine deiminase to reduce haze in a beverage. The use of a protein arginine deiminase to reduce haze in a beverage may further comprise the use of a proline-specific endoprotease. Accordingly, disclosed herein is the use of a protein arginine deiminase and a proline-specific endoprotease to reduce haze in a beverage. The features in the use for reducing haze in a beverage as disclosed herein are further outlined in the present description.

The present disclosure further relates to wort or beer comprising a protein arginine deiminase and a proline-specific endoprotease. Wort as used herein is a liquid obtained after mashing of malt and filtering the mash as disclosed herein above. Beer is a beverage obtained during a beer fermentation process for instance as disclosed herein above and known to a person skilled in the art. It was found that a wort or beer comprising a protein arginine deiminase and a proline-specific endoprotease comprises a lower amount of haze as compared to a wort of beer not comprising a protein arginine deiminase and a proline-specific endoprotease.

A protein arginine deiminase and a proline-specific endoprotease in a wort as disclosed herein are a protein arginine deiminase and a proline-specific endoprotease as defined herein above.

The wort or beer may comprise a protein arginine deiminase, wherein the protein arginine deiminase is or comprises a polypeptide having protein arginine deiminase activity which has at least 80%, or at least 85%, 86%, 87%, 88%, 89%, 90%, 91%, 92%, 93%, 94%, 95%, 96%, 97%, 98% or 99% identity to the mature amino acid sequence of SEQ ID NO: 1 and/or a proline-specific endoprotease which is or comprises a polypeptide having proline-specific endoprotease activity which has at least 80%, or at least 85%, 86%, 87%, 88%, 89%, 90%, 91%, 92%, 93%, 94%, 95%, 96%, 97%, 98% or 99% identity to the mature amino acid sequence of SEQ ID NO:2.

It was found that a wort comprising a protein arginine deiminase and a proline-specific endoprotease as disclosed herein resulted in a beer that was more stable than a beer prepared from a wort comprising protein arginine deiminase or proline-specific endoprotease alone.

EXAMPLES

Materials and Methods

Cloning and Expression of Peptidyl Arginine Deiminase (PAD) in *Aspergillus niger*

Cloning and expression of the peptidyl arginine deiminase was performed as disclosed in Examples 3 and 4 of WO2008/000714.

Proline-specific Endoprotease from *Aspergillus niger*

A commercial sample of proline-specific endoprotease from *A. niger*, Brewers Clarex® (5 PPU/g product, obtainable from DSM) was used. The activity of proline-specific endoprotease was measured on the synthetic peptide Z-Gly-Pro-pNA at 37° C. in a citrate/disodium phosphate buffer pH 4.6. The reaction products were monitored spectrophotometrically at 405 nm.

One unit (1 PPU) is defined as the quantity of enzyme that liberates 1 μmol of p-nitroanilide per minute under these test conditions.

Protein Determination

The protein content in the PAD sample was determined using a Bradford assay kit (Pierce no. 23236) and a calibration line made with BSA. The Bradford assay protocol was followed according to the recommendations of the supplier.

Haze Sensitive Protein (HSP) Analysis

Haze sensitive proteins were measured with a Tannometer using the Pfeuffer operating instructions for this method. Tannic acid was added to the samples and the haze measured under 90 degree scatter angle expressed in EBC units and reported for the addition of 2.5, 5 and 10 mg/l tannic acid (HSP2.5, HSP 5, HSP10).

Example 1. Haze Sensitive Proteins in Wort Treated with Peptidyl Arginine Deiminase, Proline-specific Endoprotease and the Combination of These Two Enzymes Wort was produced in the BRUMAS BrauEule brewing set-up, using 4.7 kg barley malt (Extra Pale Premium Pilsner Malt, Q108 Bamberg Germany) and 20 l water. The mashing diagram included a first step of 50° C. for 15 minutes, a second step at 63° C. for 15 minutes, a third step at 75° C. for 15 minutes and finally a mash off at 78° C. for 5 minutes. After mashing-off, the mash was filtered in a Lauter tun; first wort recycling was applied and a total of 10 l wash water was added towards the end of filtration. The resulting wort was boiled for 95 minutes after which good trub separations were performed with a whirlpool.

Subsequently, the wort was incubated in the presence and absence of protein arginine deiminase and/or a proline-specific endoprotease to determine their effect on the total amount of haze sensitive proteins in the wort. For this purpose, 10 g of wort was incubated without enzyme, with 4 μg/ml peptidyl arginine deiminase (PAD), with 1 mPPU/ml proline-specific endoprotease (PEP) and with a combination of 4 μg/ml peptidyl arginine deiminase and 1 mPPU/ml proline-specific endoprotease at 40° C. for 2 hours. After the incubation, the reactions were centrifuged at 5° C. at 4000 rpm for 30 min. The supernatant was used in the haze sensitive protein analysis as described above.

The results in Table 1 show that PAD and the PEP both decrease the amount of haze-sensitive proteins in the wort compared to the blank wort incubated without the addition of any enzyme. The addition of both PAD and PEP to wort resulted in the lowest amount of haze-sensitive proteins in the wort.

TABLE 1

Amount of haze-sensitive proteins (EBC units) in wort samples after addition of 2.5, 5 and 10 mg/l tannic acid, and after incubation with and without enzymes.

| Reaction | HSP2.5 (EBC units) | HSP5 (EBC units) | HSP10 (EBC units) |
| --- | --- | --- | --- |
| Blank - no enzyme | 3.2 | 8.1 | 15.1 |
| PAD 4 μg/ml | 3.1 | 7.4 | 14.4 |
| PEP 1 mPPU/ml | 1.4 | 4.2 | 10.6 |
| PAD 4 μg/ml + PEP 1 mPPU/ml | 0.8 | 2.9 | 7.6 |

Example 2: Effect of Peptidyl Arginine Deiminase and Proline-specific Endoprotease on Foam Stability in Beer The effect of PAD and PEP addition to beer on the beer's foam stability was evaluated. The following enzyme combinations were added to commercial beer bottles (Heineken, 300 ml): PEP (0.5 PPU/bottle), PAD (16.7 μg/bottle), PEP (0.5 PPU/bottle) and PAD (16.7 μg/bottle), PEP (0.5 PPU/bottle) and PAD (167 μg/bottle), and as a control no enzyme. The bottles were recapped and after incubation for five days at 20° C., a foam stability test was executed according to EBC method 9.42 using the Haffmans Foam stability tester Nibem-TPH. After making reproducible foam from the beer, the foam collapse time over a distance of 30 mm was determined with the NIBEM-TPH. The data in Table 2 show that addition of PAD, PEP and a combination of PEP and PAD did not affect the foam stability of beer.

TABLE 2

Foam collapse time over a distance of 30 mm for beers incubated with and without enzymes.

| Incubation | Foam collapse time 30 mm (s) |
| --- | --- |
| No enzyme | 282 |
| PAD (16.7 μg/bottle) | 280 |
| PEP (0.5 PPU/bottle) | 279 |
| PEP (0.5 PPU/bottle) and PAD (16.7 μg/bottle) | 281 |
| PEP (0.5 PPU/bottle) and PAD (167 μg/bottle) | 281 |

---

The invention claimed is:

1. A process for reducing haze in a beer, comprising adding a protein arginine deiminase in E.C. 3.5.3.15, and a proline-specific endoprotease in E.C. 3.4.21.26, during preparation of the beer.

2. The process according to claim 1, wherein adding the protein arginine deiminase and the proline-specific endoprotease comprises adding the protein arginine deiminase and/or the proline-specific endoprotease to a wort during preparation of the beer.

3. The process according to claim 2, wherein the protein arginine deiminase and/or the proline-specific endoprotease is/are added after filtration of mash and before boiling of the wort.

4. The process according to claim 1, wherein adding the protein arginine deiminase and/or the proline-specific endoprotease, comprises adding the protein arginine deiminase and/or the proline-specific endoprotease during and/or after fermentation of the beer.

5. Beer or wort comprising a protein arginine deiminase in E.C. 3.5.3.15, and a proline-specific endoprotease in E.C. 3.4.21.26, to reduce haze in a beverage.

6. The process according to claim 1, wherein the protein arginine deiminase is derived from a *Fusarium* sp.

7. The process according to claim 1, wherein the proline-specific endoprotease is derived from an *Aspergillus* sp.

8. The process according to claim 1, wherein the protein arginine deiminase comprises a polypeptide having protein arginine deiminase activity which has at least 80% identity to the mature amino acid sequence of SEQ ID NO: 1 and/or wherein the proline-specific endoprotease comprises a polypeptide having proline-specific endoprotease activity which has at least 80% identity to the mature amino acid sequence of SEQ ID NO:2.

9. The process according to claim 6, wherein the protein arginine deiminase is derived from *Fusarium graminearum*.

10. The process according to claim 7, wherein the proline-specific endoprotease is derived from *Aspergillus niger*.

* * * * *

SEQUENCE LISTING

```
<160> NUMBER OF SEQ ID NOS: 2

<210> SEQ ID NO 1
<211> LENGTH: 640
<212> TYPE: PRT
<213> ORGANISM: Fusarium graminearum

<400> SEQUENCE: 1

Met His Leu Leu Asn Gly Lys Thr Ala Ala Val Ala Leu Ala Leu Leu
1               5                   10                  15

Asn Ser Cys Asn Ala Leu Lys Val Thr Ile Leu Ala Asp Thr Asn Arg
            20                  25                  30

Asp Gly Lys Val Asp Asn Asn Asp Ile Asn Gly Lys Ser Thr Trp Thr
        35                  40                  45

Asn Asn Arg Gly Ala Leu Ile Leu Pro Asn Ile Gly Asp Thr Gly Ser
    50                  55                  60

Arg Cys Ala Lys Gln Trp Gly Pro Ser Val Asp Ile Gln Gly Asp Glu
65                  70                  75                  80
```

-continued

Ser Tyr Leu Asp Lys Cys Asn Asp Ala Ser Asp Asn Val Gln Arg Asn
             85                  90                  95

Pro Lys Tyr Leu Ala Ser Leu Lys Thr Leu Pro Leu Thr Thr Leu Ser
            100                 105                 110

Ala Thr Ala Lys Gly Ser Ile Ile Ile Ala Asp Lys Thr Gly Ala Ser
            115                 120                 125

Lys Val Arg Ile Phe Val Lys Gln Ser Gly Lys Trp Asn Tyr Val Ala
        130                 135                 140

Ala Asp His Val Phe Thr Ala Lys Glu Leu Lys Ser Gly Leu Glu Leu
145                 150                 155                 160

Gly Val Asp Ala Arg Asp Val Arg Pro Gln Asp Trp Asn Gly Tyr
                165                 170                 175

Ala Lys Ile Gln Phe Thr Val Thr Asp Gly Lys Thr Lys Ala Thr Asp
                180                 185                 190

Ala Val Ala Val Arg Val Ala Pro Val Leu Thr His His Gly Gln
            195                 200                 205

His Ala Gln Arg Ile Phe Thr Thr Gly Val Asn Glu Ala Gly Val Asn
        210                 215                 220

Lys Val Gln Glu Thr Phe Ile Ala Asp Ile Leu Arg Asn Val Ala Gly
225                 230                 235                 240

Ala Gly Ile Lys Glu Pro Val Phe Gln Phe His Asn Gln Asp Ile Trp
                245                 250                 255

Thr Gln Asp Phe Phe Glu Pro Gly Tyr Ala Ser Ile Pro Gly Pro Asn
                260                 265                 270

Gly Pro Val Ser Ile Arg Ile Met Ile Arg Ser Ala Gln Ser Ser Arg
            275                 280                 285

Arg Ser Gly Arg Asp Ala Phe His Asp Leu Arg Asn Asp Gln Val Gly
        290                 295                 300

Ala Val Gln His Pro Gly Asp Gly Asp Ser Ile Asp Ser Thr Gly Asn
305                 310                 315                 320

Leu Glu Thr Ile Pro Pro Tyr Ser His Asn Gly Lys Ser Phe Pro Val
                325                 330                 335

Gly Arg Thr Ile Met Gly Ala Trp Asp Gly Arg Ala Pro Leu Met Val
            340                 345                 350

Glu Phe Leu Lys Ala Gln Gln Val Gln Glu Pro Leu Ile Leu Asp Thr
        355                 360                 365

Ser Trp Leu Tyr Val Gly His Val Asp Glu Phe Ile Gln Phe Leu Pro
    370                 375                 380

Ser Asn Asn Lys Leu Gly Trp Val Ile Met Val Ala Asp Pro Met Lys
385                 390                 395                 400

Gly Val Asp Leu Leu Lys Lys Ala Val Lys Thr Gly His Gly Lys Val
                405                 410                 415

Lys Ala Val Ser Arg Pro Leu Ser Ala Asp Glu Lys Lys Glu Gln Leu
            420                 425                 430

Cys Leu Pro Arg Gln Thr Ile Ala Glu Ala Leu Lys Phe Lys Ser Phe
        435                 440                 445

Asp Ala Ile Asn Lys His Ser Ala Glu Arg Ile Gln Ala Asn Leu Asp
    450                 455                 460

Ile Ile Lys Arg Glu Thr Gly Ile Thr Asp Glu Asp Ile His Arg Val
465                 470                 475                 480

Pro Ala Leu Phe Tyr Tyr Thr Gln Ser Asn Ser Trp Leu Cys Pro Gly
                485                 490                 495

```
Glu Thr Ala Glu Asp Asp Ser Ala Gln Pro Gln Lys Ala Ala Ser Asn
            500                 505                 510

Ser Gly Ile Thr Met Lys Thr Ser Gln Gly Pro Gly Phe Lys Ala
        515                 520                 525

Lys Ser Ile Val Glu Ala Ala Thr Pro Gly Lys Ser Ile Gln Arg Arg
            530                 535                 540

Val Ile Asp Pro Ala Thr Gln Val Thr Ala Leu Tyr Pro Gly Ser Val
545                 550                 555                 560

Asn Gly Leu Val Met Thr Asp Thr Lys Leu Ala Pro Ser Pro Trp
                565                 570                 575

Gly Pro Val Ile Asn Lys Gln Asp Ile Phe Ala Ala Val Ser Gln
            580                 585                 590

Val Tyr Thr Asn Ala Gly Tyr Asn Val Thr Tyr Gln Asp Asp Trp Phe
        595                 600                 605

Ser His Phe Lys Leu Gln Gly Asp Val His Cys Gly Ser Asn Ser Trp
        610                 615                 620

Arg Glu Ile Pro Lys Lys Trp Trp Asp Ser Leu Arg Val Asn Asn Tyr
625                 630                 635                 640

<210> SEQ ID NO 2
<211> LENGTH: 521
<212> TYPE: PRT
<213> ORGANISM: Artificial Sequence
<220> FEATURE:
<223> OTHER INFORMATION: Protein sequence of A. niger proline-specific
      endoprotease with pectinemethylesterease signal sequence

<400> SEQUENCE: 2

Met Val Lys Ser Ile Leu Ala Ser Val Phe Phe Ala Ala Thr Ala Leu
1               5                   10                  15

Ala Ala Arg Pro Arg Leu Val Pro Lys Pro Val Ser Arg Pro Ala Ser
            20                  25                  30

Ser Lys Ser Ala Ala Thr Thr Gly Glu Ala Tyr Phe Glu Gln Leu Leu
        35                  40                  45

Asp His His Asn Pro Glu Lys Gly Thr Phe Ser Gln Arg Tyr Trp Trp
    50                  55                  60

Ser Thr Glu Tyr Trp Gly Gly Pro Gly Ser Pro Val Val Leu Phe Thr
65                  70                  75                  80

Pro Gly Glu Val Ser Ala Asp Gly Tyr Glu Gly Tyr Leu Thr Asn Glu
                85                  90                  95

Thr Leu Thr Gly Val Tyr Ala Gln Glu Ile Gln Gly Ala Val Ile Leu
            100                 105                 110

Ile Glu His Arg Tyr Trp Gly Asp Ser Ser Pro Tyr Glu Val Leu Asn
        115                 120                 125

Ala Glu Thr Leu Gln Tyr Leu Thr Leu Asp Gln Ala Ile Leu Asp Met
    130                 135                 140

Thr Tyr Phe Ala Glu Thr Val Lys Leu Gln Phe Asp Asn Ser Thr Arg
145                 150                 155                 160

Ser Asn Ala Gln Asn Ala Pro Trp Val Met Val Gly Gly Ser Tyr Ser
                165                 170                 175

Gly Ala Leu Thr Ala Trp Thr Glu Ser Val Ala Pro Gly Thr Phe Trp
            180                 185                 190

Ala Tyr His Ala Thr Ser Ala Pro Val Glu Ala Ile Tyr Asp Tyr Trp
        195                 200                 205

Gln Tyr Phe Tyr Pro Ile Gln Gln Gly Met Ala Gln Asn Cys Ser Lys
    210                 215                 220
```

-continued

```
Asp Val Ser Leu Val Ala Glu Tyr Val Asp Lys Ile Gly Lys Asn Gly
225                 230                 235                 240

Thr Ala Lys Glu Gln Gln Ala Leu Lys Glu Leu Phe Gly Leu Gly Ala
                245                 250                 255

Val Glu His Phe Asp Asp Phe Ala Ala Val Leu Pro Asn Gly Pro Tyr
            260                 265                 270

Leu Trp Gln Asp Asn Asp Phe Ala Thr Gly Tyr Ser Ser Phe Phe Gln
        275                 280                 285

Phe Cys Asp Ala Val Glu Gly Val Glu Ala Gly Ala Ala Val Thr Pro
    290                 295                 300

Gly Pro Glu Gly Val Gly Leu Glu Lys Ala Leu Ala Asn Tyr Ala Asn
305                 310                 315                 320

Trp Phe Asn Ser Thr Ile Leu Pro Asp Tyr Cys Ala Ser Tyr Gly Tyr
                325                 330                 335

Trp Thr Asp Glu Trp Ser Val Ala Cys Phe Asp Ser Tyr Asn Ala Ser
            340                 345                 350

Ser Pro Ile Tyr Thr Asp Thr Ser Val Gly Asn Ala Val Asp Arg Gln
        355                 360                 365

Trp Glu Trp Phe Leu Cys Asn Glu Pro Phe Phe Tyr Trp Gln Asp Gly
    370                 375                 380

Ala Pro Glu Gly Thr Ser Thr Ile Val Pro Arg Leu Val Ser Ala Ser
385                 390                 395                 400

Tyr Trp Gln Arg Gln Cys Pro Leu Tyr Phe Pro Glu Thr Asn Gly Tyr
                405                 410                 415

Thr Tyr Gly Ser Ala Lys Gly Lys Asn Ala Ala Thr Val Asn Ser Trp
            420                 425                 430

Thr Gly Gly Trp Asp Met Thr Arg Asn Thr Thr Arg Leu Ile Trp Thr
        435                 440                 445

Asn Gly Gln Tyr Asp Pro Trp Arg Asp Ser Gly Val Ser Ser Thr Phe
    450                 455                 460

Arg Pro Gly Gly Pro Leu Ala Ser Thr Ala Asn Glu Pro Val Gln Ile
465                 470                 475                 480

Ile Pro Gly Gly Phe His Cys Ser Asp Leu Tyr Met Ala Asp Tyr Tyr
                485                 490                 495

Ala Asn Glu Gly Val Lys Lys Val Val Asp Asn Glu Val Lys Gln Ile
            500                 505                 510

Lys Glu Trp Val Glu Glu Tyr Tyr Ala
        515                 520
```